Figure 1:
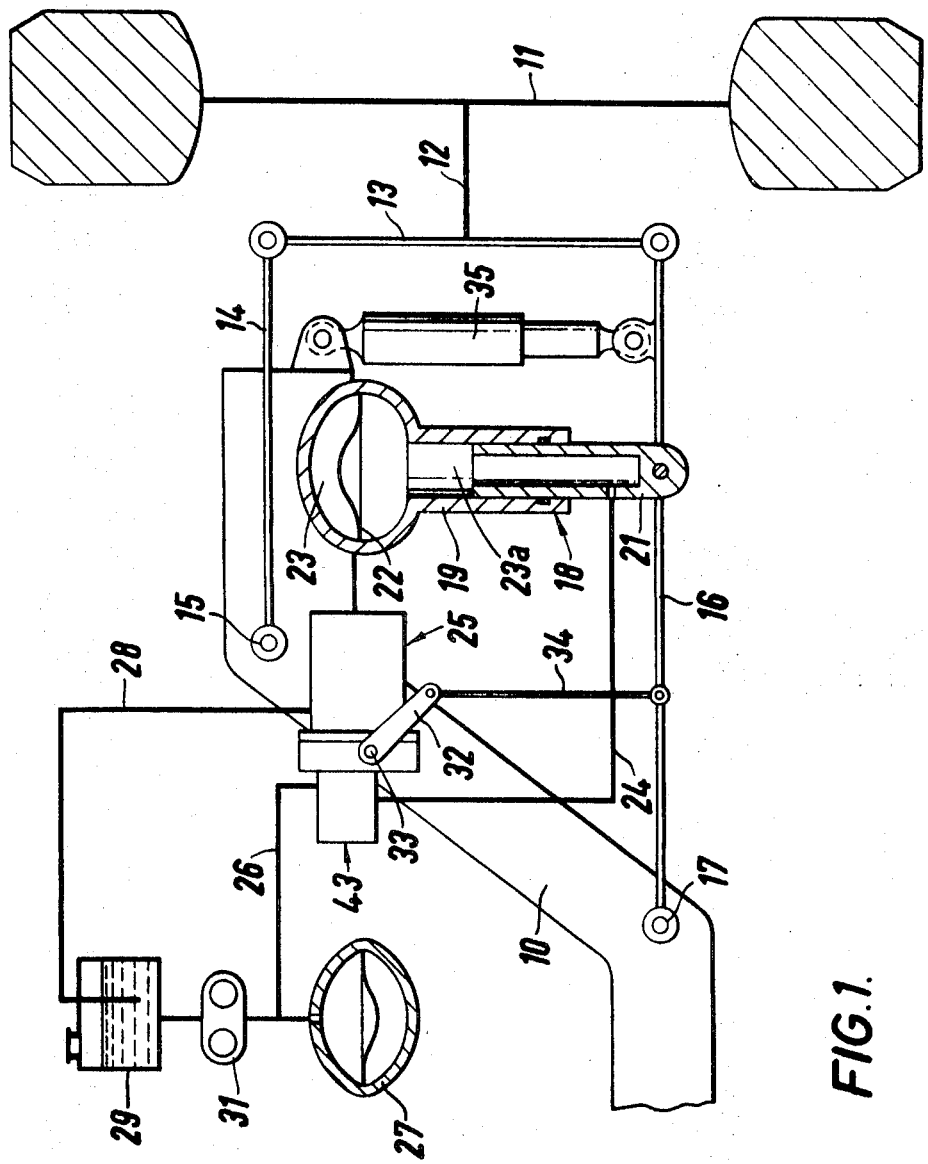

United States Patent

[11] 3,612,570

| [72] | Inventors | Robert Hazell Pitcher<br>Leamington Spa;<br>Michael W. Lewis, Solihull; Stephen J.<br>Crouch, Solihull, all of England |
|---|---|---|
| [21] | Appl. No. | 791,233 |
| [22] | Filed | Jan. 15, 1969 |
| [45] | Patented | Oct. 12, 1971 |
| [73] | Assignee | Automotive Products Company Limited<br>Leamington Spa, England |
| [32] | Priority | Jan. 15, 1968 |
| [33] | | Great Britain |
| [31] | | 2112/68 |

[54] SUSPENSION SYSTEMS FOR VEHICLES
6 Claims, 2 Drawing Figs.

[52] U.S. Cl. ............................................. 280/124 F
[51] Int. Cl. ............................................. B60g 17/04
[50] Field of Search ............................................. 280/124.1,
124 F, DIG. 1

[56] References Cited
UNITED STATES PATENTS

| 3,258,258 | 6/1966 | Hanna | 280/124 F |
| 3,175,836 | 3/1965 | Mather | 280/124 F |
| 2,650,108 | 8/1953 | Bruce | 280/124.1 |

Primary Examiner—Philip Goodman
Attorney—Lawrence J. Winter

ABSTRACT: A suspension arrangement for a vehicle in which there is interposed between the sprung mass of the vehicle and a wheel or other supporting element thereof a variable-length liquid-filled strut associated with a suspension spring device, a valve controlling the flow of liquid into and out of the strut to adjust its length is acted on by an inertia mass movably mounted on the sprung mass of the vehicle and acted on by relative movements of the sprung mass and the supporting element which movements are transmitted to the inertia mass through a resilient link acting in parallel with means providing velocity feedback.

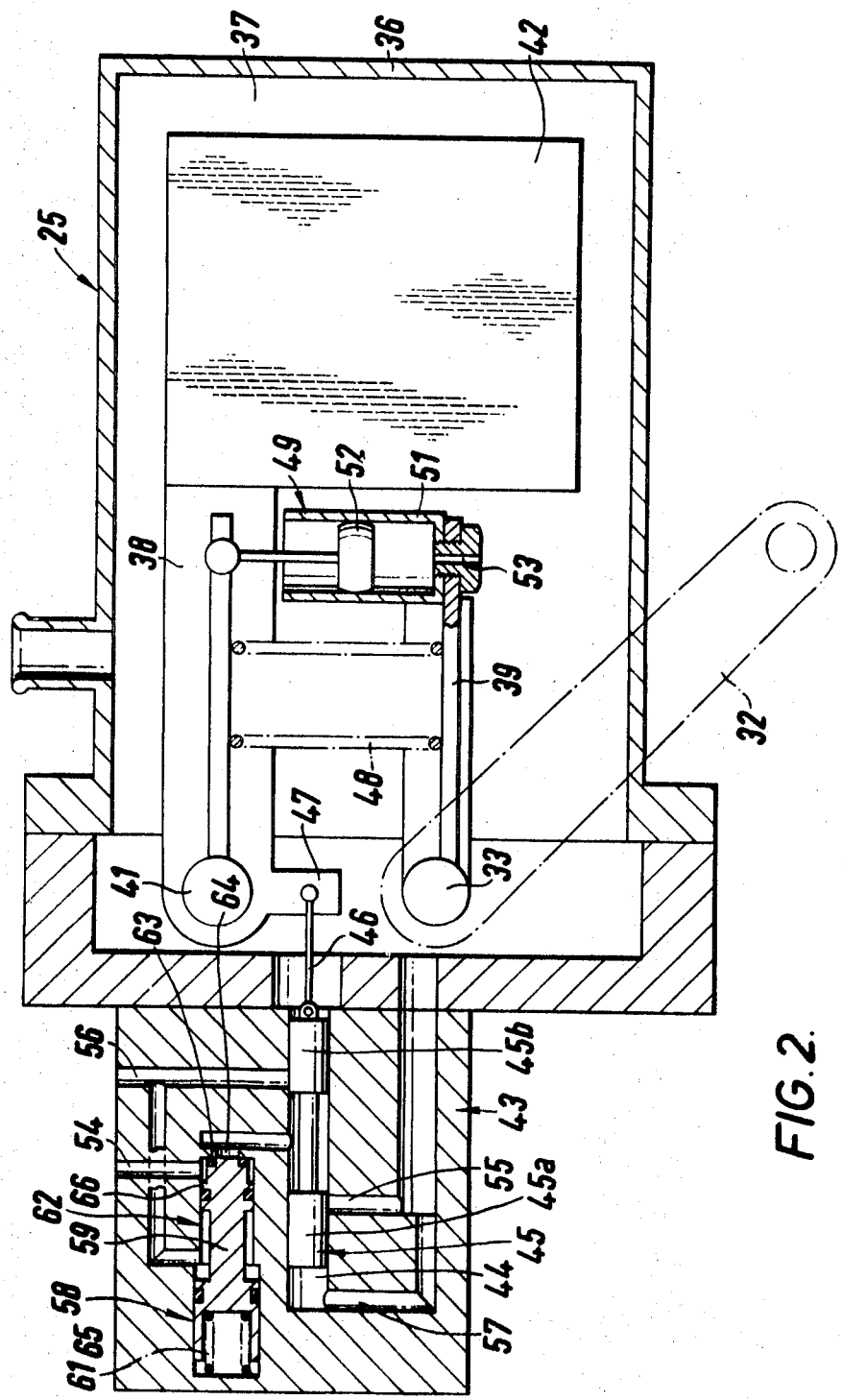

SUSPENSION SYSTEMS FOR VEHICLES

This invention relates to suspensions for vehicles, primarily for road vehicles such as passenger cars, although it may also be applicable to other forms of vehicle including rail vehicles and even track-laying vehicles.

It is generally true that all the many suspension linkages that have been proposed and used are essentially compromises between a number of conflicting factors. Thus a front suspension soft enough to give a good ride may adversely affect steering behavior. One that produces no change in camber or in track during bump deflections can result in a roll center height that produces poor cornering characteristics. In particular, although there is no problem in designing a suspension linkage that produces no roll at all, or even an inward tilt, on cornering, such a suspension is ruled out in practice by its unacceptable behavior in other respects.

Those suspensions which incorporate automatic levelling or self-levelling features give the designer of the linkage the advantage that his suspension movements on bump and rebound always occur about a known mean datum, regardless of load, and the total suspension travel to be allowed for can be less, which in its turn allows compromises in geometry to be made, which would not be permissible with greater travel.

However, it is still true, even with existing automatic levelling suspensions, that a linkage which has acceptable springing and steering characteristics necessarily allows at least some degree of roll on cornering. This is especially true of a passenger saloon car, where the suspension must be reasonably soft and where furthermore the center of gravity cannot be unduly low.

In the previous proposals which there have been for providing a liquid-filled strut in a suspension, with the flow of liquid to and from it controlled by a valve under the influence of an inertia mass, the aim has generally been to produce a suspension unit of low rate in normal bump and rebound movements by allowing liquid to escape as the wheel approaches the bodywork (on 'bump') and supplying liquid as the wheel moves downwards (on rebound). The system must be able to cope with prolonged travel over bumpy roads and, even if an accumulator is provided the consumption of liquid is still heavy and a large pump is required, consuming a lot of power. It has been proposed, in particular in systems intended to counteract roll of the vehicle bodywork, to reduce this by arranging for the control system to ignore small bumps and only respond to large ones but this by no means eliminates the problem.

The basis of the present invention lies in not attempting to modify the normal bump and rebound suspension movements, but on the contrary to arrange that the inertia mass is as far as possible insensitive to these, which are taken care of by the normal spring and damper, leaving the strut and its control system free to control rolling and/or pitching motion, and also it can control static body height. An aim of the invention is to provide a control system which makes this possible.

According to the present invention, in a vehicle suspension of the kind including, between the sprung mass of the vehicle and a wheel or other supporting element thereof, a variable-length liquid-filled strut in association with a suspension spring, the flow of liquid to and from the strut to adjust its length being controlled by a valve acted on by an inertia mass movably mounted on the sprung mass of the vehicle and acted on by relative movements of the sprung mass and the supporting element, the said movements are transmitted to the inertia mass through a resilient link acting in parallel with means providing velocity feedback.

The means providing velocity feedback may comprise a damper.

According to another aspect of the invention, a control unit, for use in combination with a liquid filled strut interposed between the sprung mass of a vehicle and a wheel or other supporting element thereof to support that part of the weight of said sprung mass which is carried by that supporting element, the control unit being operative, in response to a tendency of the sprung mass to change its level or attitude, to control the supply of liquid to and the release of liquid from said strut so as to oppose the said tendency to change, comprises a control valve having a movable member, a first arm pivotally mounted on said sprung mass and carrying a weight the center of mass of which is laterally and vertically spaced from the pivot of the arm, means operatively connecting the arm to the valve movable member, spring means acting on said first arm to oppose the action of the weight thereon and to increase the spring load as the sprung mass approaches the supporting element and to reduce the spring load as the sprung mass recedes from the supporting element.

One embodiment of the invention will now be described with reference to the accompanying drawings, in which:

FIG. 1 is a diagrammatic view showing one form of suspension for a wheel of a vehicle embodying a control unit according to the invention; and FIG. 2 is a sectional elevation, on a larger scale, of one form of control unit suitable for use in the suspension of FIG. 1.

Referring to FIG. 1 of the drawings, a part of a front axle of a vehicle is shown at 10, and a wheel 11 is mounted on a stub axle 12 carried by a suspension assembly comprising a wheel supporting member 13, an upper pivoted link 14 pivotally attached to the upper end of the member 13 and pivoted on the vehicle structure 10 at 15, and a lower pivoted link 16 pivotally attached to the lower end of the member 13 and pivoted to the front axle 10 at 17. At least one of the links 14 and 16 may be of the wishbone type. A strut 18, telescopic to enable its length to be varied has its upper cylinder portion 19 attached to the vehicle structure 10 and its lower hollow plunger portion 21 attached to the lower pivoted link 16 intermediate the ends of the latter. The cylinder portion 19 of the strut 18 is divided by a flexible diaphragm 22 or equivalent movable wall into an upper chamber 23 filled with a compressed gas and a lower chamber 23a. The lower chamber 23a, together with the hollow plunger portion, is filled with liquid. It will be understood that the strut, instead of including a compressed gas chamber, may be connected to the vehicle body by a compression spring, but in all cases it is associated with a suspension spring of one type or another.

The liquid chamber 23a in the strut is connected by a conduit 24 to a valve, hereinafter described, mounted in a control unit 25 which is mounted on the vehicle structure 10, the valve being arranged to connect the said liquid chamber either through a conduit 26 to a liquid pressure accumulator 27 or through a drain conduit 28 to a low-pressure liquid reservoir 29. A pump 31 driven by the engine of the vehicle, draws liquid from the reservoir 29 to maintain a predetermined pressure in the accumulator 27, a cutout valve (not shown) being provided in the customary manner to enable the pump 31 to circulate liquid idly back to the reservoir when a predetermined pressure is attained in the accumulator 27. The particular form of wheel suspension shown is merely one example of a wheel suspension arrangement with which the control unit according to the invention may be used. It may be associated with suspension arrangements for the rear wheels as well as the front wheels of vehicles, including wheels mounted on live axles.

An arm 32, fixedly mounted on a horizontal shaft 33 projecting from the control unit 25 is coupled by a pivoted link 34 to the lower suspension link 16 so as to be moved about the axis of the said shaft when relative up-and-down movement takes place between the axle 10 and the wheel 11. The construction and operation of the control unit 25 will be described below.

Damping means, such as a telescopic shock absorber 35 mounted between the axle 10 and the lower suspension link 16, serves to damp the relative movements of the wheel and axle.

The control unit 25, as shown in FIG. 2, comprises a housing 36 adapted to be secured to the axle 10, which forms part of the sprung mass of the vehicle, and defining a closed chamber 37 in which are mounted for movement about horizontal axes two arms 38 and 39 extending in a generally horizontal direction, the pivot axes of the two arms being in a common vertical plane. The upper arm 38 is mounted on a pivot shaft 41 and carries, at its end remote from its pivot, an inertia mass 42 the center of mass of which lies below its connection to the said arm 38. On the end of the housing 36 adjacent the pivots of the arms 38 and 39 there is mounted a valve body 43 having a horizontal valve bore 44 in which is slidable a valve spool 45 formed with two spaced lands 45a and 45b. The valve bore 44 opens at one end into the closed chamber 37, and the valve spool 45 is connected by a pivoted rigid link 46 to a downwardly extending lug 47 on the pivoted end of the upper arm 38, so that angular movement of the said arm 38 moves the valve spool 45 longitudinally in the bore 44.

The lower arm 39 is fixed to the pivot shaft 33.

A coiled compression spring 48 mounted between the upper and lower arms 38 and 39 opposes the downward load exerted on the upper arm 38 by the inertia mass 42, and a velocity feedback device in the form of a liquid pressure damper 49 is also mounted between the said arms, the damper 49 comprising a cylinder 51, open at its upper end and fixed to the lower arm 39, and a plunger 52 carried by the upper arm 38 and depending into the cylinder 51. The lower end of the cylinder 51 is closed except for a restricted orifice 53 opening into the closed chamber.

The liquid space 23a in the strut 18 is connected by the conduit 24 to a port 54 opening into the valve bore 44 between the lands 45a and 45b on the valve spool 45. Two other ports 55 and 56 leading from the valve bore 44, one on each side of the port 54, are so spaced apart that when the valve spool 45 is in a midposition they are each just covered by one of the lands on the valve spool. The port 56 nearer to the housing 36 on the valve body is connected to the accumulator 27, the other port 55 being connected to the closed chamber 37 which is in turn connected by the conduit 28 to the liquid reservoir 29 from which the pump 31 draws liquid. The closed end of the valve bore 44 is also connected to the closed chamber by a passage 57.

The valve body 43, as well as housing the spool valve, has mounted in it a pressure maintenance valve, generally indicated by the reference numeral 58, this valve being provided to prevent loss of liquid from the strut 18 during prolonged standing of the vehicle. It is known that spool valves are not absolutely fluidtight due to the fact that the spool must be a sliding fit in the bore, so that the spool valve hereinbefore described could not, therefore, be relied upon to hold pressure in the strut 18 for any length of time when the vehicle was standing.

The pressure maintenance valve 58, as shown in FIG. 2, comprises a plunger 59 urged by a spring 61 towards one end of a bore 62 so that a resilient seal 63 on one end of the plunger seats around an orifice 64 in the end of the bore 62 leading to the part 54 of the spool valve. The conduit 24 leading from the chamber 23a in the strut 18 leads into the maintenance valve bore adjacent the end thereof at which the orifice 64 is formed. The bore 62 is stepped, and the plunger 59 is formed with two lands 65 and 66, of different diameters, engaging in the two parts of the bore. The conduit 26, leading from the accumulator 27, is connected to the bore 62 between the two plunger lands 65 and 66, so that pressure from the accumulator, acting on the land of greater diameter tends to move the plunger 59 against the spring 61, moving the seal 63 away from its seat to connect the strut chamber 23a to the spool valve, but when there is no pressure in the accumulator the plunger is moved by the spring 61 to cause the seal 63 to engage its seat and isolate the strut chamber from the spool valve.

With the valve spool 45 in its midposition liquid is trapped in the strut chamber 23a to support the weight of the vehicle, and this conditions is maintained so long as the load on the vehicle is such that the lower arm 39 is held in a position at which the load on the spring 48 balances the inertia mass 42. If the load is increased, the lower arm 39 is moved upwardly increasing the compression of the spring 48 and so lifting the inertia mass 42, thus moving the upper arm to open the pressure port 56 of the valve and cause further liquid to be forced into the strut. The vehicle body is thus moved upwardly until the spring load is reduced to again balance the weight 42, and the connection of the strut chamber 23a to the pressure supply is cut off. Conversely, if the load is reduced, the lower arm 39 is moved downwardly, reducing the spring load, and the inertia mass 42 moves downwardly, moving the valve spool 45 to connect the strut chamber 23a to the closed chamber 37, with the result that liquid escapes from the strut until the spring load again balances the inertia mass. Thus the vehicle is maintained at a constant level despite the changes of load.

When a vehicle travels in a curved path, centrifugal force acting on the sprung mass at its center of mass, which is above the wheel centers, tends to produce an outward rolling movement of the sprung mass. If the upper and lower arms of control units according to the invention associated one with each wheel of the vehicle are mounted so that their pivots are at their ends nearest to the longitudinal center line of the vehicle, centrifugal force acting on the inertia masses 42 at the side of the vehicle on the outside of the curve will tend to cause those weights to swing upwardly, whereas centrifugal force acting on the inertia masses 42 on the other side of the vehicle will tend to cause them to swing downwardly. Thus the spool valves of the control units 25 on opposite sides of the vehicle will be operated in opposite directions, admitting liquid to the struts on the outer side and releasing liquid from the struts on the inner side, and thus reducing or eliminating the roll.

The liquid pressure damper 49 provides a velocity feedback between the two arms 38 and 39, as well as damping the movements of the inertia mass 42, and thus reducing undesirable hunting or oscillation about a mean position.

The arrangement according to the invention enables the valve to be so controlled that it is sensitive only to static load changes and centrifugal forces during cornering or inertia forces due to acceleration or braking, thus reducing the quantity of liquid which has to be supplied to the struts and the frequency of operation of the valve. As already described, the wheel suspension for each wheel includes a shock absorber 35 to damp the relative movements of the wheel and the sprung mass, and it will be seen that the control unit 25 is a miniature suspension system corresponding to that for the vehicle wheel, the inertia mass 42 corresponding to the vehicle body, the coiled compression spring 48 corresponding to the resilient support for the sprung mass provided by the air in the chamber 23, and the liquid pressure damper 49 corresponding to the suspension shock absorber 35. Both the main suspension system and the miniature system share the same conditions, namely the movements of the wheel relative to the body. For example, if a wheel of the vehicle strikes a bump it will be accelerated upwardly at a certain rate, and the sprung mass will be accelerated upwardly at a lesser rate due to the action of the spring unit 23 and shock absorber 35. Similarly, the inertia mass 42 on the upper arm will be accelerated upwardly, also at a lesser rate than the wheel, due to the action of the spring 48 and the liquid pressure damper 49. It is an important feature of the invention that, by adjusting the two systems one in relation to the other so that the inertia mass 42 accelerates at the same rate as the sprung mass and so maintains, during normal travel of the vehicle, a substantially constant position relative to the housing 36, the valve is arranged to be operated only as a result of static load changes or of centrifugal forces during cornering, thus reducing the quantity of liquid which has to be supplied to the struts and the frequency of operation of the valve.

We claim:

1. A vehicle suspension system comprising a vehicle axle forming a sprung mass, resilient means connected thereto and a variable length liquid filled strut connected in series with said resilient means, a wheel supporting member, and a wheel supported by said wheel supporting member, linkage means operatively connected to said wheel supporting member and said sprung mass, and strut to vary the overall length of said strut, a control unit including a valve connected to said strut to control flow of liquid to and from said strut to adjust its overall length, said control unit including an inertia mass movably mounted on said spring mass for movement with respect to relative movement of said sprung mass and said wheel and wheel support member, said valve being operatively connected to said inertia mass for movement thereby, and other linkage means for connecting said inertia mass to said wheel supporting member and wheel comprising a damping device operatively connected to said inertia mass and spring means operatively connected to said mass and disposed in parallel with said mass to provide a damping action of the inertia mass with respect to said wheel & wheel supporting member whereby said sprung mass is subjected to forces proportional to the displacement of said sprung mass in relation to said wheel and wheel supporting member and also to forces proportional to the velocity of the wheel and supporting member in relation to the sprung mass.

2. A control unit according to claim 1 wherein the other mechanical linkage means includes a first arm carrying the inertia mass and pivotally mounted on the vehicle sprung mass, and second arm pivotally mounted on the vehicle sprung mass and connected to the wheel and supporting element so as to be moved about its pivot by movement of said wheel and supporting member relative to the sprung mass, and said spring means and the damping device being mounted between the said first and second arms.

3. A vehicle suspension of claim 1, wherein the valve of the control unit has a movable member and the other linkage means includes a first arm adapted to be pivotally mounted on the sprung mass of the vehicle, said inertia mass being carried by said first arm with its center of mass both laterally and vertically spaced from the pivot of the said first arm, the valve movable member being operatively connected to said first arm so as to be moved by movement of said arm about its pivot, a second arm pivotally mounted on said sprung mass and connected to the wheel and supporting means for movement about its pivot by relative movement of the sprung mass and said wheel and supporting element, the spring means being mounted between said first and second arms and acting to oppose the action of the inertia mass on the first arm, the arrangement being such that movement of the second arm as the sprung mass approaches the wheel and supporting means increases the loading of the spring means and movement of the second arm as the sprung mass recedes from the wheel and supporting means reduces the loading of the spring means.

4. A vehicle suspension of claim 3 wherein the damping device damps relative movement of the first and second arms.

5. A vehicle suspension of claim 4 wherein the damping device is a liquid-pressure vibration damper.

6. A control unit for adjusting the variable length liquid-filled strut mounted in a vehicle suspension system in series with a suspension spring disposed between the sprung mass of a vehicle and its wheel and wheel supporting means comprising a housing with a valve therein adapted to be operatively connected to the strut to control liquid flow to and from the strut, an inertia mass in said housing for movable mounting on the vehicle sprung mass, said valve being operatively connected to said inertia mass for activation by said inertia mass, a mechanical linkage for connecting the inertia mass to the vehicle wheel including spring means and a damping device in said housing disposed adjacent each other and between two arm members pivotally connected to said inertia mass, with said damping device and spring means being disposed with respect to said arm members to act in parallel with each other to provide damping motion of the inertia mass in relation to the vehicle wheel.